(12) United States Patent
Sandri et al.

(10) Patent No.: US 10,023,233 B2
(45) Date of Patent: Jul. 17, 2018

(54) AUXILIARY FRAME FOR SUPPORTING A FRONT SUSPENSION OF A MOTOR-VEHICLE

(71) Applicant: C.R.F. Società Consortile per Azioni, Orbassano (Turin) (IT)

(72) Inventors: Silvano Sandri, Saluzzo (IT); Maurizio Meneguzzo, Turin (IT); Massimo Biasiolo, Turin (IT)

(73) Assignee: C.R.F. Società Consortile per Azioni, Orbassano (Turin) (IT)

(*) Notice: Subject to any disclaimer, the term of this patent is extended or adjusted under 35 U.S.C. 154(b) by 36 days.

(21) Appl. No.: 15/346,104

(22) Filed: Nov. 8, 2016

(65) Prior Publication Data
US 2017/0240208 A1 Aug. 24, 2017

(30) Foreign Application Priority Data

Feb. 18, 2016 (EP) ..................... 16156391

(51) Int. Cl.
*B60N 99/00* (2006.01)
*B62D 21/15* (2006.01)
*B62D 21/11* (2006.01)
*B62D 21/02* (2006.01)

(52) U.S. Cl.
CPC .......... *B62D 21/155* (2013.01); *B62D 21/02* (2013.01); *B62D 21/11* (2013.01); *B60Y 2304/03* (2013.01); *B60Y 2304/05* (2013.01); *B60Y 2306/01* (2013.01); *B60Y 2410/124* (2013.01)

(58) Field of Classification Search
CPC ...... B62D 21/155; B62D 21/02; B62D 21/11; B60Y 2304/03; B60Y 2304/05; B60Y 2306/01; B60Y 2410/124
See application file for complete search history.

(56) References Cited

FOREIGN PATENT DOCUMENTS

| CN | 204355150 U | * | 5/2015 |
|---|---|---|---|
| DE | 102012111032 A1 | | 5/2013 |
| DE | 102012111557 A1 | | 5/2013 |
| DE | 102012206610 A1 | | 10/2013 |

OTHER PUBLICATIONS

European Search Report, dated Jul. 27, 2016, for corresponding European Patent Application No. 16156391.1.

* cited by examiner

*Primary Examiner* — Lori L Lyjak
(74) *Attorney, Agent, or Firm* — Heslin Rothenberg Farley & Mesiti P.C.; Victor A. Cardona, Esq.

(57) ABSTRACT

An auxiliary frame for supporting elements of a front suspension of a motor-vehicle includes two end supports for connection thereto of suspension elements and a structure which connects the end supports to each other. The connecting structure has a front beam and a rear beam which connect the end supports to each other. The rear beam has an arch-like configuration which extends substantially in a horizontal plane, with a central portion arranged in a forwardly spaced position. The front beam of the connecting structure has a configuration which is substantially straight and perpendicular to a vertical median plane of the auxiliary frame. The front beam and the rear beam are longitudinally spaced from each other and connected to each other by at least two lateral longitudinal arms spaced from each other and which have a configuration substantially straight and parallel to the vertical median plane of the auxiliary frame.

18 Claims, 8 Drawing Sheets

FIG. 8

AUXILIARY FRAME FOR SUPPORTING A FRONT SUSPENSION OF A MOTOR-VEHICLE

CROSS REFERENCE TO RELATED APPLICATIONS

This application claims priority from European patent application No. 16156391.1 filed on Feb. 18, 2016, the entire disclosure of which is incorporated herein by reference.

FIELD OF THE INVENTION

The present invention relates to an auxiliary frame for supporting elements of a front suspension of a motor-vehicle, which frame is to be connected to a motor-vehicle body, of the type comprising two end supports, for connection thereto of the suspension elements, and a connecting structure which connects said end supports to each other and which comprises a front beam and a rear beam which connect said end supports to each other, said rear beam of said connecting structure having an arch-like configuration substantially extending in a horizontal plane, with a central part located in a forwardly spaced position, with reference to the motor-vehicle travel direction, with respect to the lateral ends of said rear beam.

PRIOR ART

An auxiliary frame for supporting motor-vehicle front suspension elements of the type indicated above is described and illustrated for example in document DE10 2012 111557 A1.

OBJECT OF THE INVENTION

The object of the present invention is to provide an auxiliary frame for a motor-vehicle of the type indicated at the beginning of the present disclosure which is simple, light and inexpensive to manufacture.

A further object of the present invention is to provide an auxiliary frame by which the loads applied to the motor-vehicle suspension can be absorbed effectively.

Finally, a last but not less important object of the present invention is to provide an auxiliary frame which has a structure sufficiently robust in order to bear loads deriving from an impact of the motor-vehicle.

SUMMARY OF THE INVENTION

In view of achieving the above objects, the present invention relates to an auxiliary frame having the features which have been indicated at the beginning of the present disclosure and further characterized in that said front beam of said connecting structure has at least for a major portion of its length a substantially straight configuration perpendicular to a vertical median plane of the auxiliary frame, said front beam and said rear beam are longitudinally spaced from each other, said front beam and said rear beam are connected to each other by at least two lateral longitudinal arms spaced from each other and each having a configuration which is substantially straight and parallel to a vertical median plane of the auxiliary frame.

Thanks to aforesaid features, the auxiliary frame according to the invention enables the loads applied to the motor-vehicle suspension to be absorbed effectively, maintaining at the same time a structure which is simple, light and of inexpensive production.

According to a further feature of the invention, the arch-like rear beam of the connecting structure has ends adapted for connection to the motor-vehicle body.

Furthermore, the front beam and the rear beam of the auxiliary frame are connected to each other by a longitudinal beam element with a quadrangular cross-section, interposed between said two lateral longitudinal arms and located on one side with respect to the vertical median plane of the auxiliary frame. The longitudinal beam element has an opened front end which is arranged through the front beam so that it can receive inside thereof an element for connection to the powertrain structure of the motor-vehicle.

According to a first embodiment of the auxiliary frame of the present invention, each lateral longitudinal arm is part of a single tube structure having a rear end rigidly connected to said rear beam, an intermediate portion which is arranged through the front beam and a front portion which forwardly projects from the front beam and is curved laterally outwardly to be joined to a respective end support.

According to a second embodiment of the auxiliary frame of the present invention, the two structural elements for attachment to the body and the front beam of the connecting structure are made in a single piece with the front beam of the auxiliary frame.

The present invention also provides a motor-vehicle comprising an auxiliary frame having the above indicated features, in which the motor-vehicle comprises also a steering system mounted on the auxiliary frame by means of an attachment pin coupled within a hole provided in an upper wall of said element with quadriangular cross-section and by means of further pins each coupled with two or more attachment points, formed on each end support of the auxiliary frame.

DETAILED DESCRIPTION OF SOME EMBODIMENTS

Further features and advantages of the invention will become apparent from the following description with reference to the annexed figures, given purely by way of non limiting example, in which.

In the drawings reference number 1 general designates an auxiliary frame according to the present invention, for supporting elements of a motor-vehicle front suspension and which is to be connected to the lower portion of a motor-vehicle body.

FIGS. 1-6 show a first embodiment of the auxiliary frame 1 according to the present invention.

The auxiliary frame 1 comprises two end supports 2, arranged for connection thereto of elements of the suspension and to be anchored to the motor-vehicle body, and a connecting structure 3 which connects the end supports 2 to each other.

Figure 1:
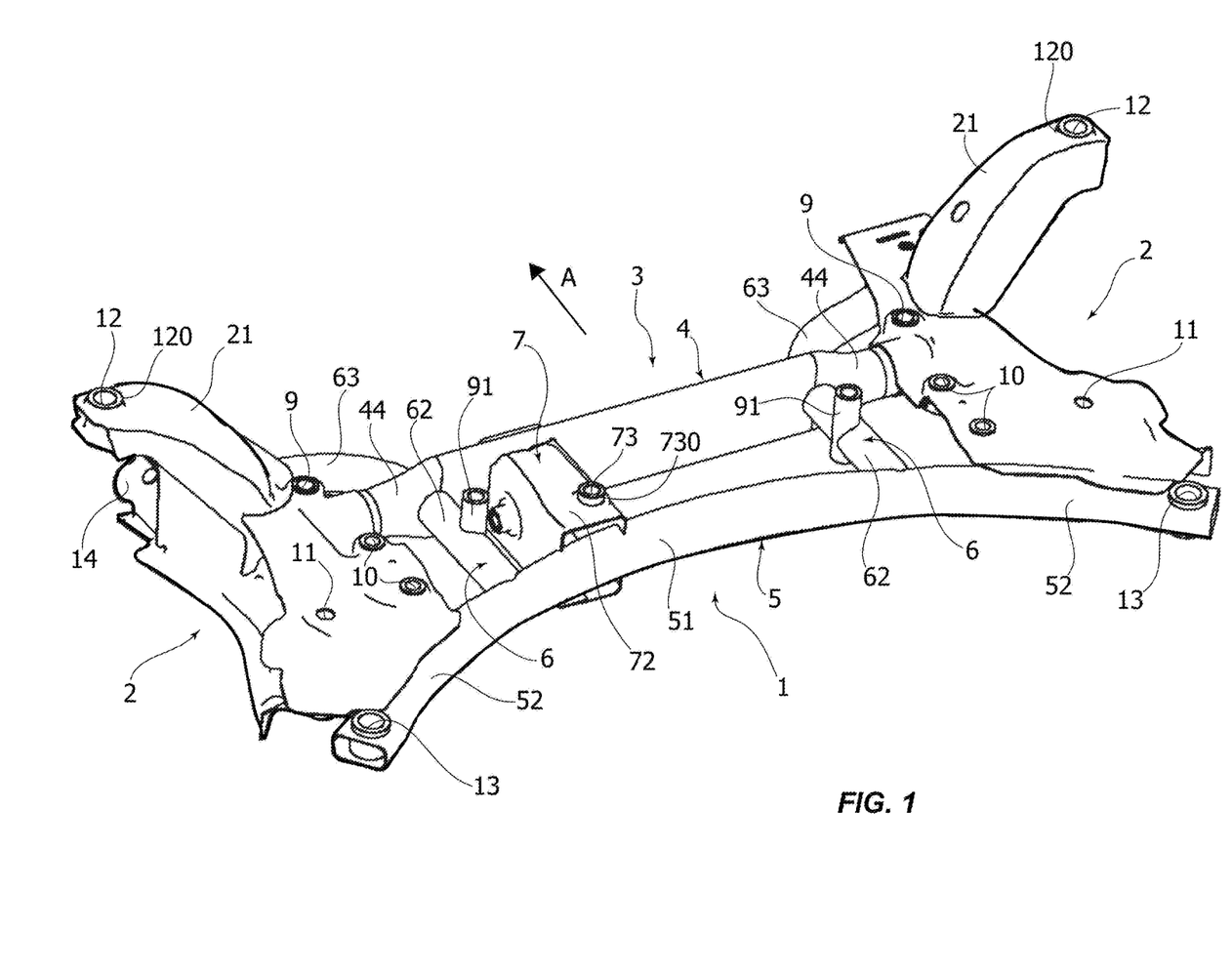
FIG. 1 shows a perspective view of a first embodiment of an auxiliary frame for supporting motor-vehicle front suspension elements according to the present invention.
Figure 2:
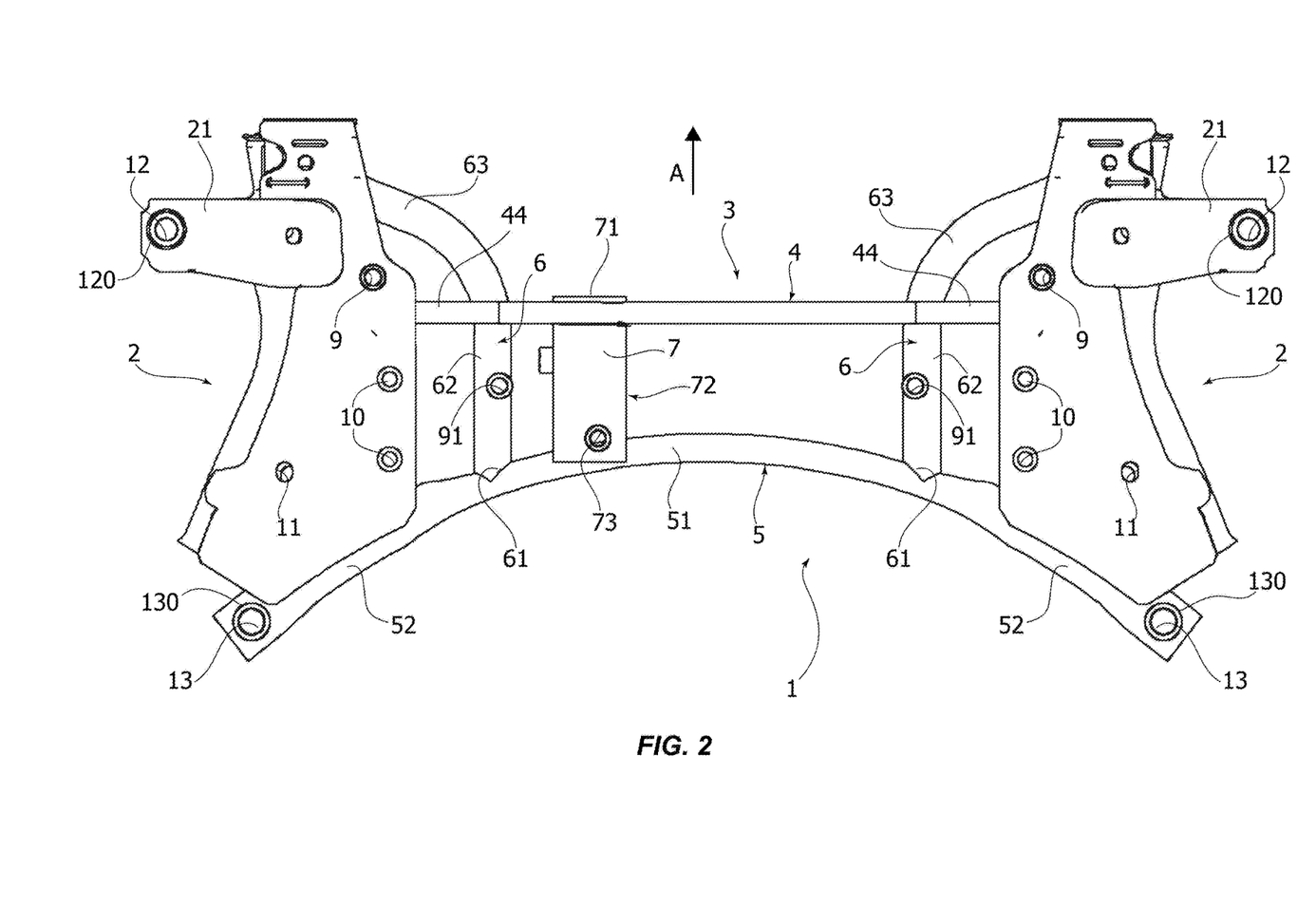
FIG. 2 shows a top view of the auxiliary frame illustrated in FIG. 1.
Figure 3:
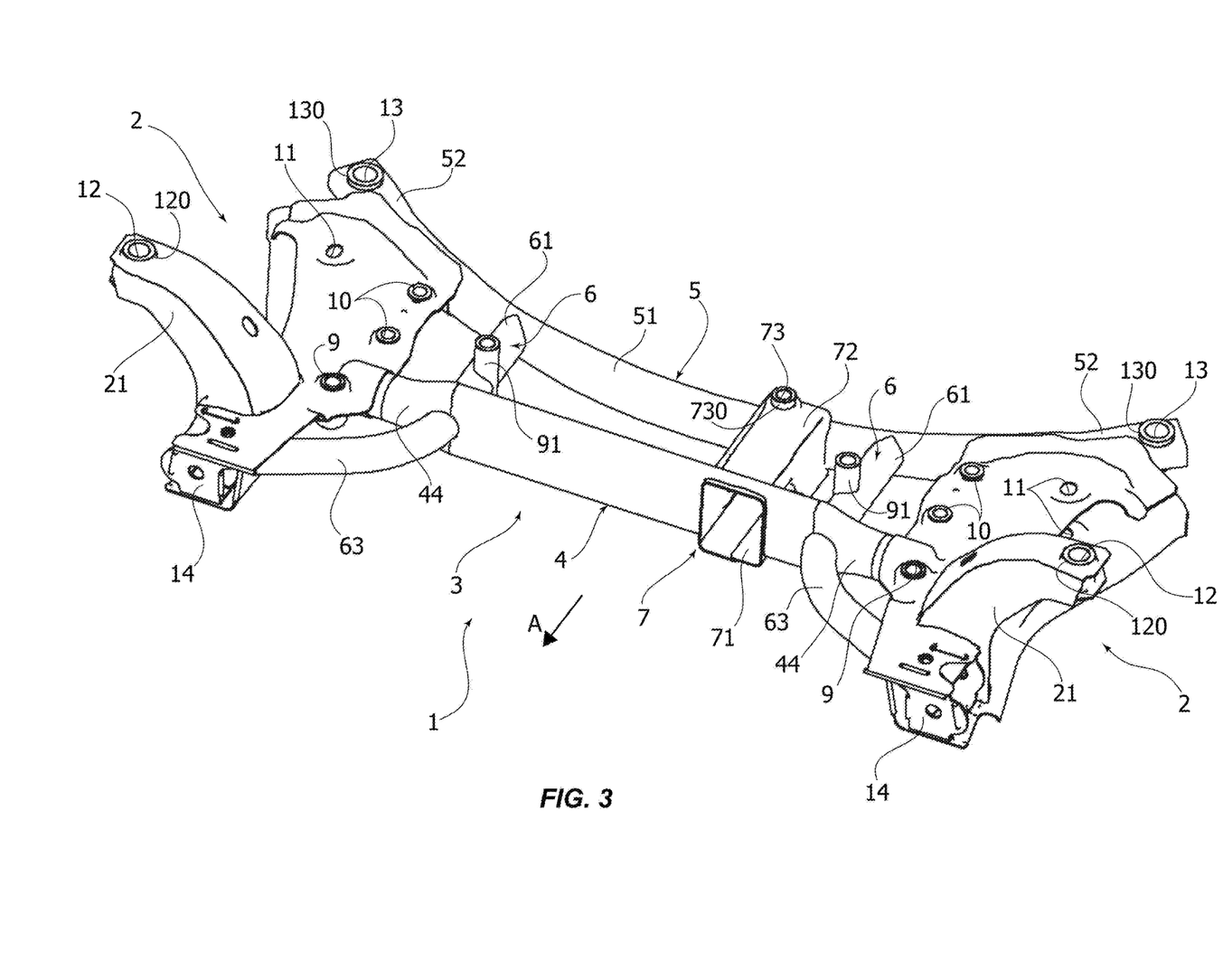
FIG. 3 shows a further perspective view of the auxiliary frame illustrated in FIGS. 1 and 2.

In particular, as illustrated in FIGS. 1-3, the connecting structure 3 comprises a front beam 4 and a rear beam 5 which connect the end supports 2 to each other.

In the present description and in the claims which follow, the terms "front" and "rear" are used with reference to the travel direction of the motor-vehicle, indicated in the drawings by arrow A.

In the illustrated example, the front beam 4 and the rear beam 5 both have a tubular shape with a closed cross-section having a profile with an oval shape, as will be better described below. In an alternative embodiment of the invention (not illustrated herein), the front beam 4 has a cross-section with a closed profile while the rear beam 5 has a cross-section with an opened profile.

According to an important feature of the auxiliary frame 1, the rear beam 5 of the connecting structure 3 has an arch-like configuration. As visible for example in FIG. 2, the arch-like rear beam 5 extends in a horizontal plane with a central part 51 thereof located in a forwardly spaced position (with reference to the motor-vehicle travel direction A) with respect to its lateral ends 52.

With particular reference to FIG. 2, the front beam 4 of the connecting structure 3 has at least for a major portion of its length a configuration which is substantially straight and perpendicular to a vertical median plane of the auxiliary frame 1.

A significant feature of the invention lies in that the front beam 4 and the rear beam 5 are longitudinally spaced from each other and are connected together by two lateral longitudinal arms 6. The lateral longitudinal arms 6 are spaced from each other and are arranged symmetrically at the two sides of said vertical median plane of the frame. The arms 6 have a configuration which is substantially straight and parallel to said median vertical plane.

In particular with reference to the top view of FIG. 2, and more in general with reference to FIGS. 1-6 showing the first embodiment of the frame 1, each lateral longitudinal arm 6 is part of a single tubular structure. Such a tubular structure has a rear end 61 rigidly connected to the rearm beam 5, an intermediate portion 62 which is arranged through the front beam 4 and finally a front portion 63 which forwardly projects from the front beam 4. The front portion 63 is also laterally curved outwardly to be joined to a respective end portion of the end support 2.

Thanks to the above illustrated features, the auxiliary frame according to the present invention has a low weight structure and at the same time sufficient robustness to effectively absorb loads acting on the motor-vehicle suspension elements.

In particular with reference to FIGS. 1, 2, 3, 5, 6 a structural element 21 for attachment to the motor-vehicle body is rigidly connected (by welding) to each end support 2 of the auxiliary frame 1. Each structural element 21 is constituted by a hollow metal sheet element, with a quadrangular cross-section, extending in a vertical direction from the respective end support 2. Furthermore, structural elements 21 have a tapered shape along their vertical extension and a curved shape towards the external sides of the motor-vehicle (with reference to a mounted condition on the motor-vehicle).

As previously indicated, structural elements 21 are arranged for attachment to the body of a motor-vehicle to which the auxiliary frame according to the present invention is associated. In particular, the terminal end of each of two structural elements 21 carries a bushing 120 having a substantially vertical axis defining a hole 12 for mounting of elastic supports for connection to the motor-vehicle body.

Again in order to enable a connection to the motor-vehicle body, the rear beam 5 carries a bushing 130 with a substantially vertical axis at each of its lateral ends 52. The bushings 130 are arranged for mounting elastic supports for the connection to the motor-vehicle body. As a consequence of the above described arrangement, the auxiliary frame 1 according to the present invention has an overall of four attachment points to the motor-vehicle body, two front attachment points at holes 12 and two rear attachment points at holes 13.

Figure 4:
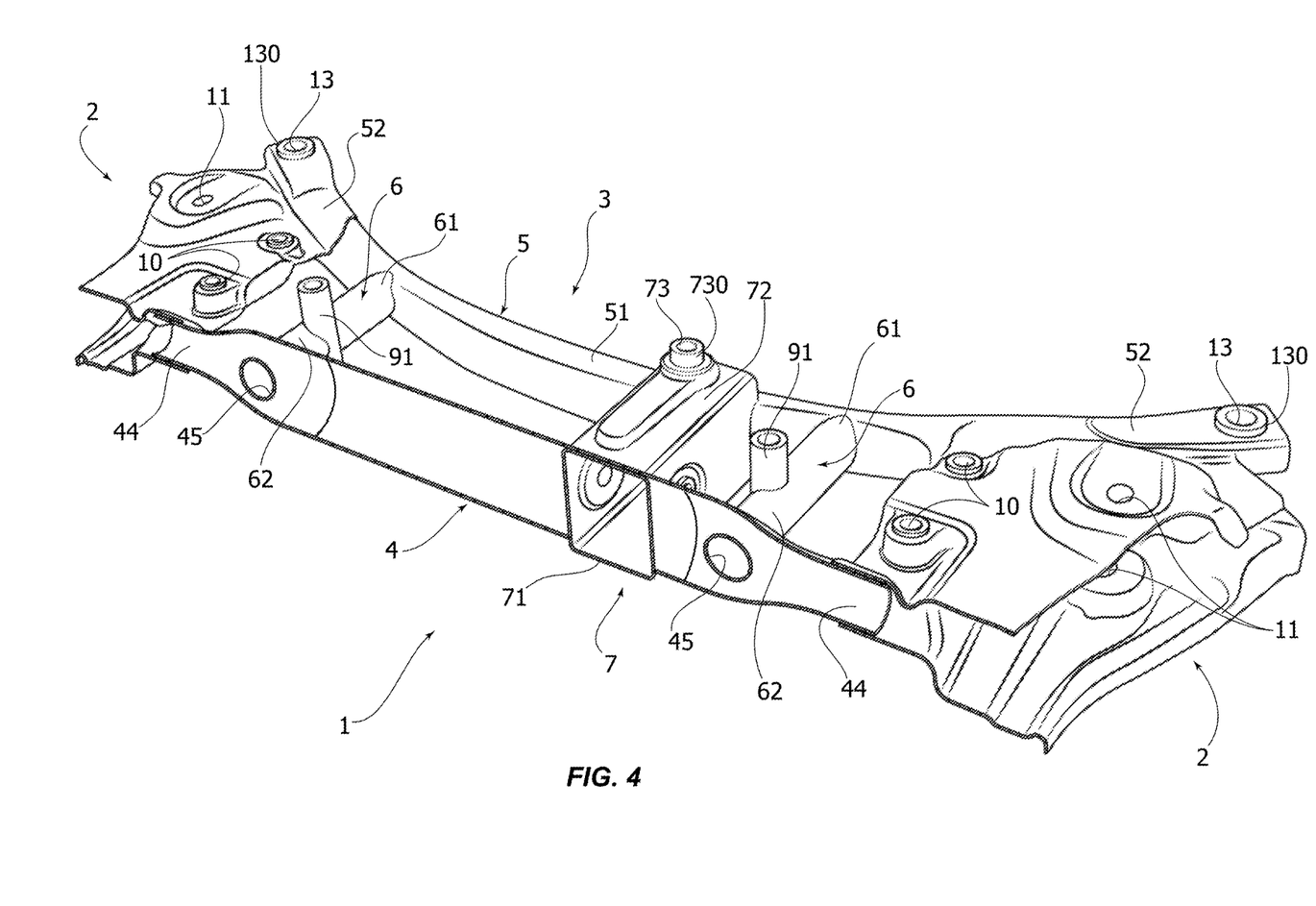
FIG. 4 shows a cross sectional view of the auxiliary frame illustrated in previous figures, according to a vertical plane perpendicular to the travel direction of the motor-vehicle.

In particular with reference to the perspective view of FIG. 3 and to the cross sectional view of FIG. 4 of the auxiliary frame 1, each end support 2 has a shell structure constituted by an upper metal sheet element and a lower metal sheet element welded to each other.

The above described shell structure is particularly adapted for connection of a suspension element (not illustrated herein), specifically an oscillating arm. In the illustrated example, for this purpose, on the upper sheet element and on the lower sheet element of each end support 2 two coaxial holes 11 are arranged, with a substantially vertical axis, for the connection of a first portion of a triangular oscillating suspension arm. Each of the two end supports 2 also comprises a bracket 14 provided on the front portion of the end support 2 in order to enable the connection of a second portion of said triangular suspension arm.

The upper sheet element of the shell structure of each of the two end supports 2 also has a pair of holes 10 for coupling with a torsion bar of the motor-vehicle front suspension (not illustrated in the drawings).

Furthermore, again on each of the two end supports 2 an attachment 9 is arranged for the connection with a motor-vehicle steering system, as will be further illustrated in the following.

Figure 5:
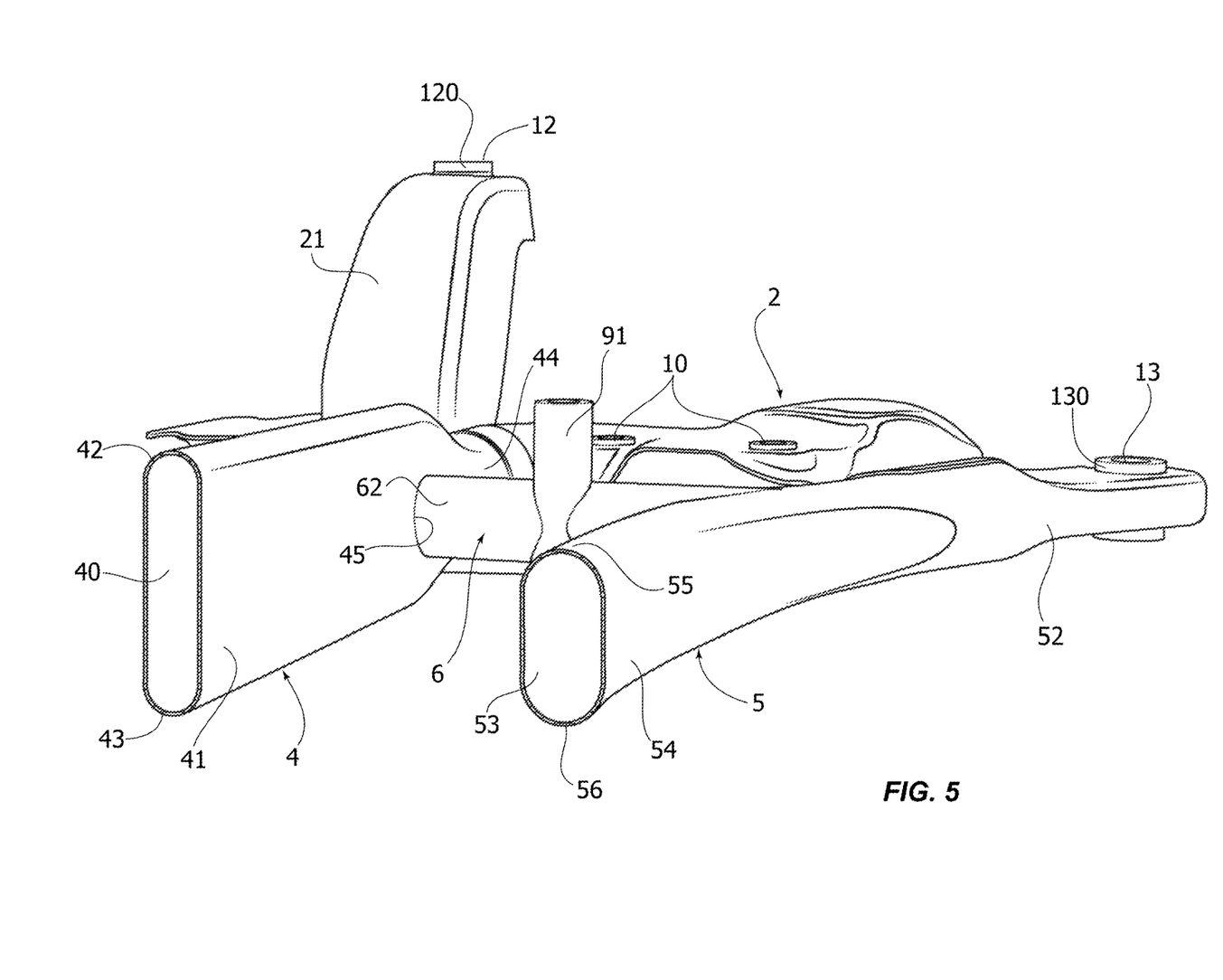
FIG. 5 is a cross sectional view of the auxiliary frame illustrated in the previous figures, according to a vertical plane which is substantially parallel to the travel direction of the motor-vehicle.

FIG. 5 shows a cross-sectional view of the auxiliary frame 1 according to a vertical plane which is substantially parallel to the travel direction of the motor-vehicle.

As illustrated in this figure, the front beam 4 with a substantially straight configuration and the rear beam 5 with an arch-like configuration both have a hollow cross-section of vertically elongated oval shape.

More specifically, the front beam 4 has two vertical planar walls 40, 41, parallel to, and spaced from, each other, joined by an upper rounded wall 42 and by a lower rounded wall 43. Similarly, the rear beam 5 has two vertical planar walls 53, 54 parallel to, and spaced from, each other, joined by an upper rounded wall 55 and by a lower rounded wall 56.

At each of its ends, the front beam 4 has a portion 44 with reduced cross-section (see in particular FIG. 4 which shows a longitudinal sectional view according to a vertical plane perpendicular to the travel direction of the motor-vehicle) which is received within a seat 20 formed between the two sheet-metal half-shells which constitute the end support 2.

At each of its lateral ends 52, the rear beam 5 has a portion which is vertically flattened, so as to have a horizontally elongated cross-section. This end portion has an upper horizontal wall and a lower horizontal wall, which are planar and parallel to each other, between which the bushing 130 defining the hole 13 for the connection to the motor-vehicle body is mounted.

Although a cross-section with a vertically elongated oval shape is preferred for the beams 4, 5, since this is optimal for obtaining the desired features of strength for the structure, however it is also possible to provide a cross section with a different shape, such as a circular shape or an oval shape with different configuration.

As already indicated above, the lateral longitudinal arms 6 have their intermediate portions 62 which extend through the front beam 4. For this purpose, walls 40, 41 of the beam 4 have two pairs of corresponding holes 45 for enabling passage of the arms 6.

In the embodiment illustrated herein, both beams 4, 5 can be obtained from folded and welded metal sheets or from hydro-formed tubes, so as to be able to differentiate where required and thus optimizing the wall thickness.

According to a relevant feature of the present invention the front beam 4 and the rear beam 5 are connected to each other not only by arms 6, but also by a longitudinal beam element 7, with a quadrangular cross-section, for example constituted by a folded and welded metal sheet element.

The longitudinal beam element 7 is interposed between said two longitudinal lateral arms 6 and located on one side with respect to the vertical median plane of the auxiliary frame 1. The longitudinal beam element 7 has an opened front end 71 which is located through holes formed in walls 40, 41 of the front beam 4. Thanks to this feature, the beam element 7 is adapted for mounting therein a connection element (such as a pivoted rod, not illustrated) to be connected to the powertrain structure of the motor-vehicle for counteracting powertrain movements relative to the motor-vehicle structure, according to a technique which is known per se.

Figure 6:
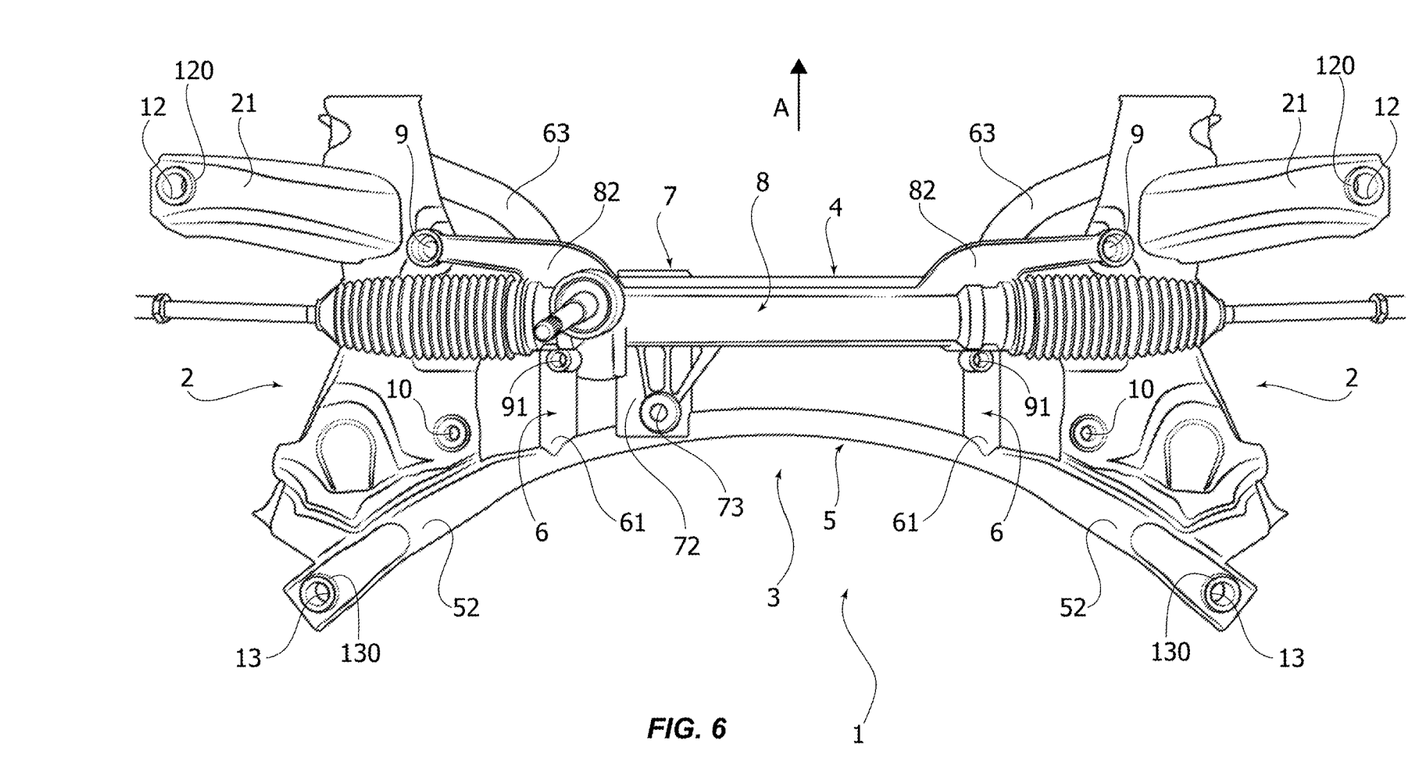
FIG. 6 shows a top view of the auxiliary frame illustrated in the previous figures, on which a steering system is mounted.

The longitudinal beam element 7 has also an upper wall 72 on which a bushing 730 is mounted defining a hole 73 for mounting a steering system 8. FIG. 6 shows a top view of the auxiliary frame 1 according the first embodiment of the present invention with the steering system 8 associated thereto. The steering system 8 is of any known type and is mounted on the auxiliary frame 1 by means of pins each coupled with one of the two attachment holes provided on each end support 2 of the auxiliary frame 1. The steering system 8 has two arms 82, each one connected to the respective attachment hole 9. As illustrated in FIG. 6, the steering system 8 is mounted also on the auxiliary frame 1 by means of an attachment pin associated to the hole 73 provided for the connection with said element for connection to the motor-vehicle powertrain structure. As a consequence, both the element for connection to the powertrain structure and the steering system 8 can be connected to the auxiliary frame 1 with the same hole 73 and the same attachment pin. According to the above described configuration and as illustrated in FIG. 6, the steering system 8 contributes to the overall structural strength of the auxiliary frame 1.

In a variant in which the steering system 8 does not contribute to the structural strength of the auxiliary frame 1, the steering system 8 is mounted on the auxiliary frame 1 at two attachment holes 91 each arranged on arms 6.

Figure 7:
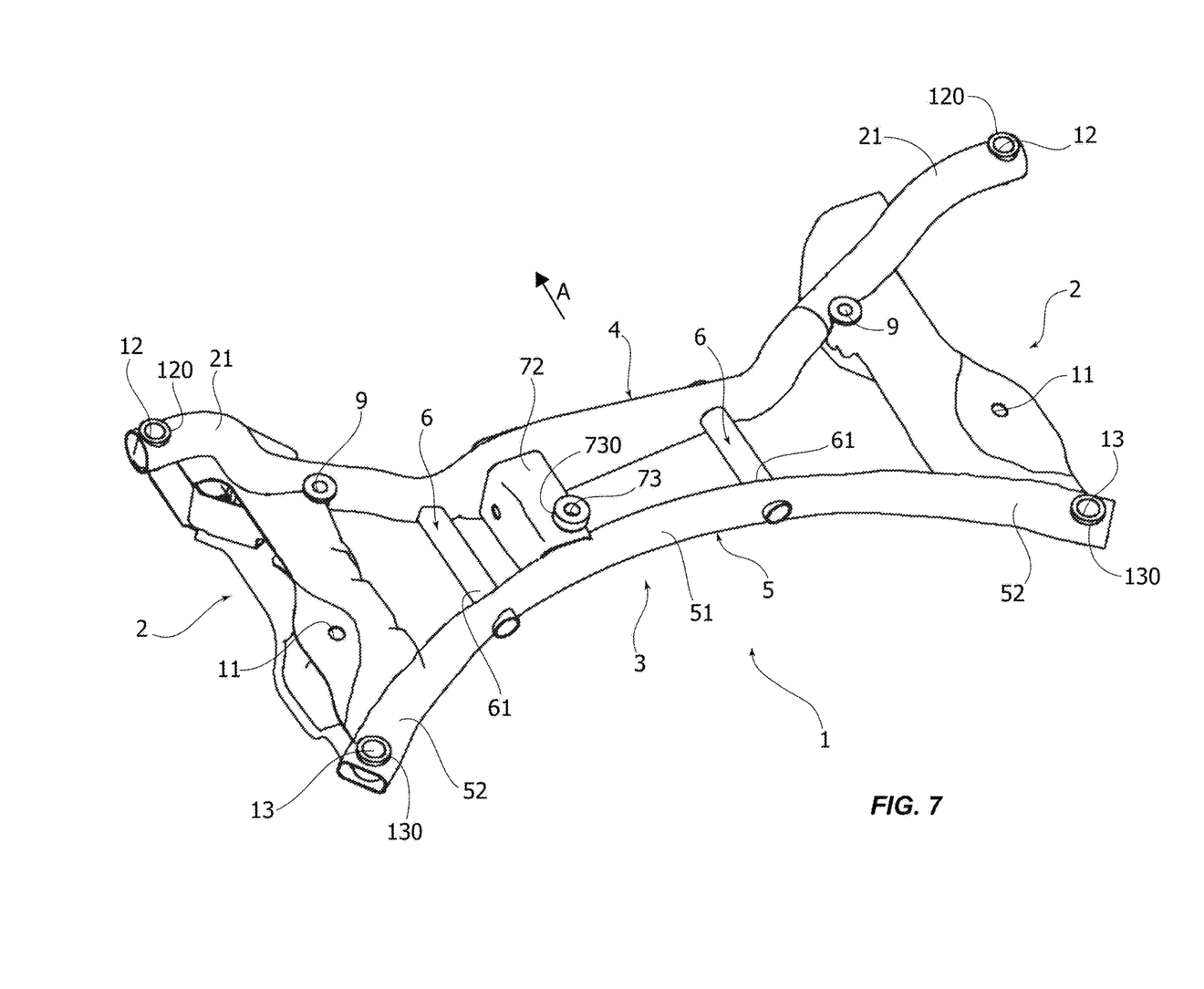
FIG. 7 shows a perspective diagrammatic view of a second embodiment of the auxiliary frame according to the present invention.
Figure 8:
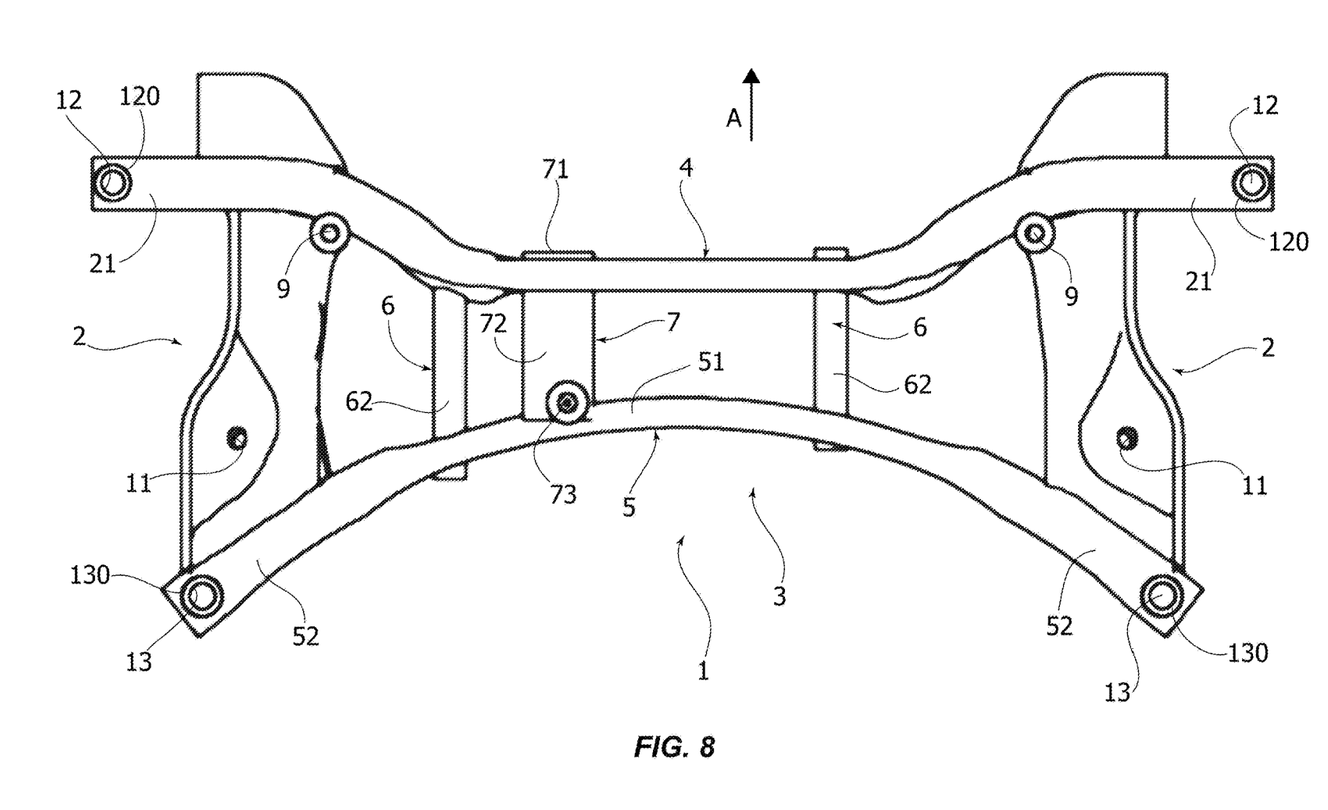
FIG. 8 shows a diagrammatic top view of the auxiliary frame illustrated in FIG. 7.

FIGS. 7, 8 show a second embodiment of the auxiliary frame 1 according to the present invention respectively with a diagrammatic perspective view and a diagrammatic top view.

The embodiment illustrated in FIGS. 7, 8 is different from the previous embodiment since the two structural elements 21 for attachment to the body and the front beam 4 of the connecting structure 3 are formed in a single piece with the front beam 4.

This feature enables to further simplify the structure with respect to the embodiment illustrated in FIG. 1-6, in particular with regard to the structure of the lateral longitudinal arms 6, which in this case do not have the laterally outwardly bent front portion 63.

The auxiliary frame 1 according the present invention enables loads acting on the motor-vehicle suspension to be absorbed effectively, while obtaining at the same time a light, simple and inexpensive structure. Thanks to the present invention, a further achieved advantage is obtaining an auxiliary frame which has enough robustness for bearing loads resulting from an impact of the motor-vehicle.

Naturally, while the principle of the invention remains the same, the details of construction and the embodiments may widely vary with respect to what has been described and shown purely by way of example, without departing from the scope of the invention.

What is claimed is:

1. Auxiliary frame to be connected to a motor-vehicle body, for supporting elements of a front suspension of a motor-vehicle, said auxiliary frame comprising:
    two end supports, for connection thereto of the supporting elements,
    a connecting structure which connects said end supports to each other,
    wherein said connecting structure comprises a front beam and a rear beam which connect said end supports to each other,
    wherein said rear beam of said connecting structure has an arch-like configuration substantially extending in a horizontal plane, with a central portion located in a forwardly spaced position, with reference to the travel direction of the motor-vehicle, with respect to lateral ends of said rear beam,
    said front beam of said connecting structure having at least for a major portion of its length a substantially straight configuration perpendicular to a vertical median plane of the auxiliary frame,
    said front beam and said rear beam longitudinally spaced from each other,
    said front beam and said rear beam connected to each other by at least two lateral longitudinal arms spaced from each other and each having a configuration which is substantially straight and parallel to a vertical median plane of the auxiliary frame, and
    said front beam having a cross-section with a closed profile and said rear beam having a cross-section with an open profile.

2. Auxiliary frame according to claim 1, wherein said front beam and said rear beam each have a tubular shape with a cross-section having a closed profile with circular or oval shape.

3. Auxiliary frame according to claim 1, wherein each of said end supports comprises a structural element for attachment to the body, provided for connection to the motor-vehicle body.

4. Auxiliary frame according to claim 1, wherein said arch-like rear beam has lateral ends adapted for connection to the motor-vehicle body.

5. Auxiliary frame according to claim 1, wherein said front beam and said rear beam are connected to each other by a hollow longitudinal beam element, with a quadrangular cross-section, interposed between said two lateral longitudinal arms and located on one side with respect to the vertical median plane of the auxiliary frame.

6. Auxiliary frame according to claim 5, wherein said longitudinal beam element has an opened front end which is arranged through said front beam, so that it can receive inside thereof an element for connection to the powertrain structure of the motor-vehicle.

7. Auxiliary frame according to claim 6, wherein said longitudinal beam element has an upper wall with a hole for mounting an attachment pin, to be coupled with said element for connection to the powertrain structure of the motor-vehicle.

8. Auxiliary frame according to claim 1, further comprising two or more attachments for connection of a steering system.

9. Auxiliary frame according to claim 3, wherein each structural element for attachment to the body is connected rigidly to a respective one of said end supports.

10. Auxiliary frame according to claim 1, wherein each of said lateral longitudinal arms is part of a single tubular structure having a rear end rigidly connected to said rear beam, an intermediate portion which is arranged through said front beam and a front portion which forwardly projects from the front beam and is laterally bent outwardly, ending into a connection to a respective end support.

11. Auxiliary frame according to claim 3, wherein the structural element for attachment to the body of each of said end supports and said front beam of the connecting structure are in a single piece with said front beam.

12. Motor-vehicle comprising an auxiliary frame according to claim 1.

13. Motor-vehicle, comprising an auxiliary frame according to claim 7, and a steering system mounted on said auxiliary frame by means of said attachment pin associated to said hole and by means of further pins each coupled with said two or more attachments arranged on each end support of said auxiliary frame.

14. Motor-vehicle, comprising an auxiliary frame according to claim 8, and a steering system mounted on said auxiliary frame by means of said attachment pin associated to said hole and by means of further pins each coupled with said two or more attachments arranged on each end support of said auxiliary frame.

15. Motor-vehicle comprising an auxiliary frame according to claim 2.

16. Motor-vehicle comprising an auxiliary frame according to claim 3.

17. Motor-vehicle comprising an auxiliary frame according to claim 4.

18. Motor-vehicle comprising an auxiliary frame according to claim 5.

* * * * *